May 3, 1949.　　　　　E. C. STRONG　　　2,469,137
VIBRATION INDICATOR
Filed Oct. 20, 1945　　　　　　　　　　2 Sheets-Sheet 1
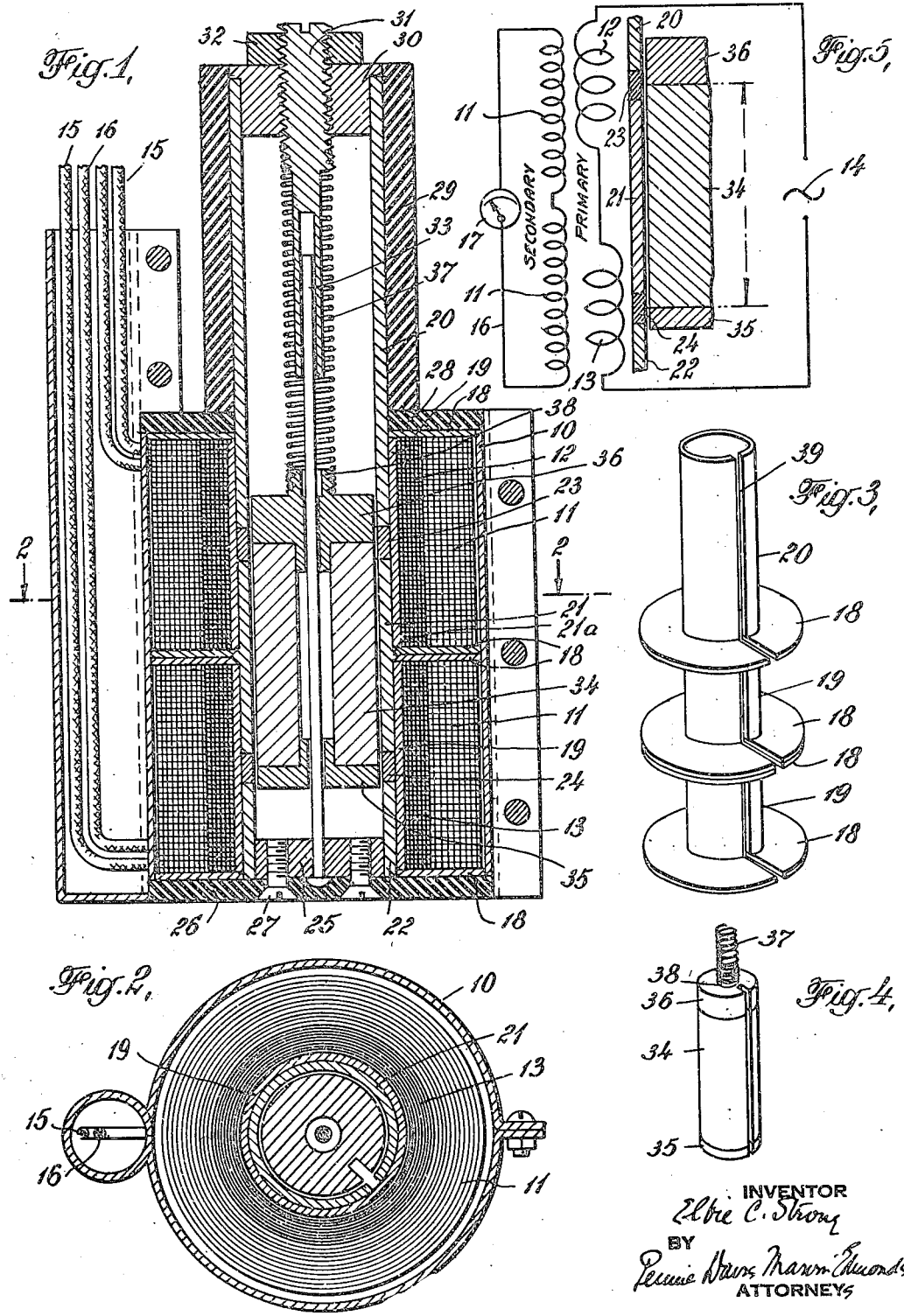
INVENTOR
Elbre C. Strong
BY
Pennie Davis Marvin Edmonds
ATTORNEYS

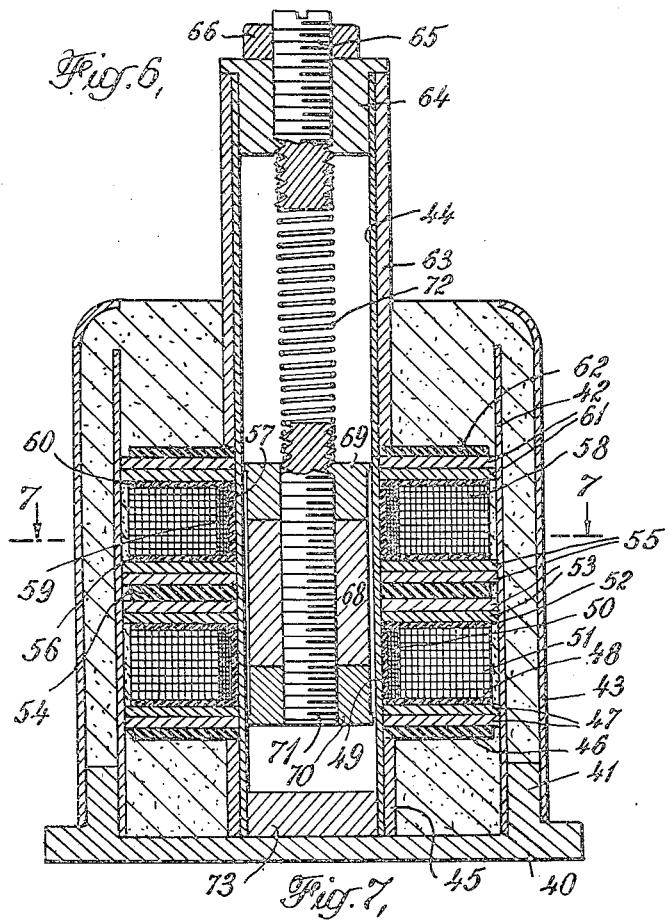
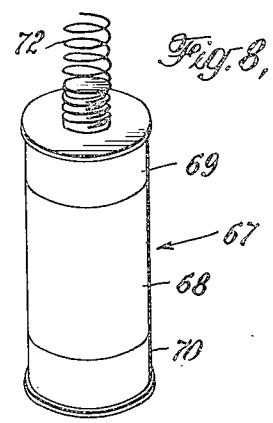
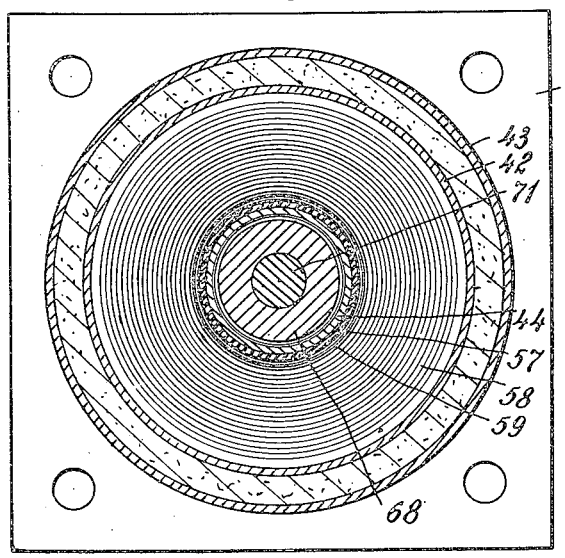
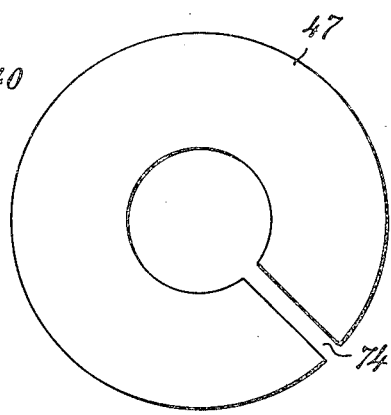

Patented May 3, 1949

2,469,137

UNITED STATES PATENT OFFICE 2,469,137

VIBRATION INDICATOR

Elbie C. Strong, Sunnyside, N. Y., assignor to Waugh Equipment Company, New York, N. Y., a corporation of Maine Application October 20, 1945, Serial No. 623,595

7 Claims. (Cl. 171—119)

This invention relates to devices for detecting and indicating the amplitude of vibration of a structure and is concerned more particularly with a novel vibration pick-up which is of simple, inexpensive construction and produces an output which may be indicated directly and without amplification by means of a suitable instrument, such as a meter. The new pick-up is small and compact, so that it may be readily installed in a restricted space and it will operate for long periods without attention.

At the present time, it is important to know the amplitude of vibration of structures of various kinds, as, for example, airplane engines, since excessive vibration ordinarily indicates a condition which requires prompt correction. The vibration of an airplane engine may be caused not by a lack of mechanical balance in the engine, but by improper operating conditions, as, for example, if a valve sticks or the spark plugs are fouled, the engine will not fire properly, and vibration will result. Accordingly, it is desirable that means be provided on the instrument panel of a plane to indicate the amount of vibration of each of the engines. The new pick-up may be advantageously employed for that purpose, and it is useful in numerous other applications.

The pick-up of the invention is of the magnetic type, and it includes a pair of aligned coaxial secondary windings which are excited by a primary winding supplied with alternating current. The secondary windings are connected so that their outputs are opposed, and they are partially enclosed within a structure of magnetic material, which provides magnetic paths for the respective secondaries, each path being complete, except for a gap extending lengthwise of its winding. An armature is mounted for movement lengthwise of the windings, and it is of a length substantially equal to the distance between the mid-points of the gaps. This armature is supported on a spring mounting and, when it is at rest, the armature lies with its ends substantially aligned with the mid-points of the gaps. Preferably, the secondary windings are disposed one above the other, and the armature is suspended by the spring mounting within the windings.

When the new pick-up is mounted on a structure, the vibration of which is to be indicated, vibration of the structure above a specific frequency causes the windings to vibrate axially while the armature remains at rest. The armature forms part of the magnetic path for each secondary winding, and when the relative movement of the windings and the armature occurs so that the ends of the armature are displaced relative to the gaps, the gap in the magnetic path through one secondary is reduced and the gap in the magnetic path through the other secondary is increased. As a result, the outputs of the secondaries are unbalanced and the pick-up produces a net output which can be employed to produce an indication on a suitable instrument, such as a milliammeter of the rectifier type. The meter reading varies directly with the amplitude of the vibration of the structure, on which the pick-up is mounted, and can be indicated in any suitable terms.

For a better understanding of the invention, reference may be made to the accompanying drawings, in which Fig. 1 is a longitudinal sectional view through one form of the new pick-up;

Fig. 2 is a sectional view on line 2—2 of Fig. 1;

Fig. 3 is a view in perspective of a core assembly used in the pick-up;

Fig. 4 is a view in perspective of the armature of the pick-up of Fig. 1;

Fig. 5 is a diagram illustrating the mode of operation of the pick-up;

Fig. 6 is a view similar to Fig. 1, showing a modified construction;

Fig. 7 is a view on the line 7—7 of Fig. 6;

Fig. 8 is a view in perspective of the armature of the Fig. 6 pick-up; and

Fig. 9 is a plan view of a part used in the pick-up of Fig. 6.

The pick-up shown in Fig. 1 comprises a cylindrical housing 10 of magnetic material, such as suitable steel, and within the housing are a pair of coaxial secondary windings 11 in longitudinal alignment, which are excited by primary windings 12, 13. The outputs of the secondaries are opposed and, for this purpose, the secondaries may be connected in series opposition while the primaries are connected in series, or, as shown, the primaries may be connected in series opposition and the secondaries connected in series. The primary windings receive alternating current from an alternator 14, preferably operating at a frequency of 400 cycles per second, through conductors 15. Conductors 16 lead from the remote ends of the secondary windings to a meter 17, which, in the construction shown, is a rectifier type milliammeter.

Open center discs 18 of magnetic material are disposed within the housing at the ends of and between the secondary windings, a pair of the discs 18 lying between adjacent ends of the windings. Within the windings are tubular members 19 of non-magnetic material, such as brass, and these tubular members are mounted on a core of magnetic material made up of three sections 20, 21, and 22. Adjacent ends of sections 20 and 21 are separated by a ring 23 of non-magnetic material, and a similar ring 24 separates adjacent ends of sections 21 and 22. With the arrangement described, each of the secondaries is partially enclosed within ferrous members consisting of housing 10, discs 18 at top and bottom, and core sections 20, 21, 22. The ferrous members provide magnetic paths for the respective windings, and each path has a gap filled by a brass ring 23 or 24.

A plug 25 of non-magnetic material is mounted within the lower end of core section 22, and the discs 18 at the lower ends of the windings are held in place by a plate of insulating material 26 secured in position by screws 27, which pass through it and into plug 25. A plate 28 of insulating material is mounted in the upper end of the housing to overlie the top discs 18, and core section 20 extends out through plate 28 and lies within a tube 29 of insulating material. A plug 30 of non-magnetic material is disposed within the upper end of core section 20, and a supporting member 31 is threaded through the plug 30 and held in place by a nut 32, the supporting member and nut being of non-magnetic material. The supporting member has a hollow lower end, into which extends the upper end of a guide rod 33, which passes through plug 25 and has a head clamped between the plug and plate 26.

An armature, which is of generally cylindrical form and is made up of a central section 34 of magnetic material and end sections 35, 36 of non-magnetic material, lies within the core, and it has a lengthwise opening through which the rod 33 extends. The armature is suspended from the supporting member 31 by means of a spring 37, which is screwed on the inner threaded end of the supporting member 31 and on a threaded stud 38 extending upwardly from the upper end of the top section 33 of the armature. The magnetic section 34 of the core has a length substantially equal to the distance axially of the windings between the mid-points of the non-magnetic rings 23, 24, and in the normal condition of the instrument, the armature is supported with its ends substantially opposite the mid-points of rings 23, 24.

In constructing the pick-up, a pair of discs 18 having their inner edges beveled, are slipped over opposite ends of the core section 21, which is formed with a central circumferential rib 21a of triangular section. The tubular members 19 are then slipped over section 21 to abut the discs 18. The rings 23 and 24 are then inserted within the tubular members, and the core sections 20 and 21 are inserted within the ends of the tubular members and moved into engagement with rings 23, 24. As indicated in Fig. 3, all the parts are formed with slits 39 to reduce eddy current effects, and in the assembly, the parts are positioned so that their slits are aligned. When the core assembly shown in Fig. 3 has been completed and the parts secured together by appropriate means, the windings are applied, and thereafter the core assembly carrying the windings is inserted within the housing 10 with the other parts of the device.

In the operation of the device, the pick-up unit is mounted on the structure, the vibration of which is to be indicated, and conductors 15 are connected to a suitable source of alternating current and conductors 16 are connected to an instrument, such as a rectifying type of milliammeter. When the structure is not vibrating, the armature of the pick-up remains at rest in the position shown in Fig. 1, and under those conditions, each end of the magnetic section of the armature lies substantially opposite the mid-points of brass rings 23, 24, which represent the gaps in the magnetic circuits for the respective secondaries. The flux threading the upper secondary 11, for example, passes through core section 20 to its lower end, for example, and thence to the nearest point of the magnetic section 34 of the armature. The flux then flows through the armature to the disc 18 at the bottom of upper coil 11, and thence through the housing wall to the upper disc 18. Similarly, the flux threading the lower secondary 11 flows into the magnetic section of the armature at the gap filled by the brass ring 24. As the ends of the magnetic section of the armature lie at the mid-points of the gaps and the secondaries are substantially identical and are equally excited by the primary, the outputs of the two secondaries, which are in opposition, produce no total output and no indication appears on the meter.

When the structure on which the pick-up is mounted begins to vibrate, the pick-up itself vibrates correspondingly, and if the vibration of the structure is below a critical frequency, the armature will move up and down by expansion and contraction of spring 37. When the frequency of vibration of the structure exceeds the critical value, the armature will stay stationary and the remainder of the pick-up will vibrate with the structure. As a result, there will be a relative movement of the armature and the air gaps in the magnetic circuits of the two secondaries. Thus, for example, the secondaries may move upward relative to the armature, so that the upper end of the magnetic section of the armature lies below the lower end of the gap filled by ring 23. At the same time, the lower end of the magnetic section of the armature will lie below the gap filled by ring 24. In that relation of the parts, the flux threading the upper secondary winding 11 will have to pass through a non-magnetic medium from the lower end of core section 20 to the upper end of core section 21, while the flux threading the lower secondary 11 will pass from the lower end of core section 21 into the magnetic section of the secondary, and from the latter into core section 22. There will thus be a greater gap in the magnetic path of the upper secondary than in the magnetic path of the lower secondary and the magnetic reluctance of the paths will differ. As a result, the lower secondary will have a greater output than the upper, and the secondaries will produce a net output which will be indicated on meter 17.

The critical frequency of vibration of the pick-up unit at which the armature will remain at rest while the remainder of the unit is vibrating depends on the mass of the armature, the characteristics of spring 37, and other well known factors. This critical frequency may be as low as about 300 cycles per minute, and the unit will be constructed to have a critical frequency which will permit its use for its intended purpose.

The pick-up unit shown in Fig. 6 is of the same general construction as that shown in Fig. 1 and operates in the same manner. The Fig. 6 unit comprises a base 40 having vertical circular flange 41, within which is telescoped the lower end of a steel tube 42, while a tubular brass shell 43 is telescoped over the outer surface of flange 41. A tube 44 of non-magnetic material rests on the upper surface of the base and at its lower end it is enclosed within a short length 45 of non-magnetic tubing. An open center disc 46 of insulating material encircles tube 44 and rests upon the top of tube section 45. Upon disc 46 are discs 47 of magnetic material with a disc 48 of insulating material resting upon the upper disc 47. A tubular section of insulating material 49 rests upon disc 48 and upon section 49 is wound a section 50 of a primary winding, over which is wound a secondary winding 51. An insulating disc 52 rests on top of the windings, and above this disc are discs 53 of magnetic material. With the arrangement described, the windings 50 and 51 are partially enclosed within ferrous members consisting of tube 42 and discs 47 and 53. These ferrous members provide a magnetic path for the flux threading secondary 51, and the path has a gap extending from the upper disc 47 to the lower disc 53 through the interior of the winding.

A disc 54 of insulating material rests on the upper disc 53, and above disc 54 are discs 55 of magnetic material. Above discs 55 is a disc 56 of insulating material and a tubular section 57 of insulating material encloses a portion of tube 44 and rests on disc 56. A primary winding section 58 is wound on tube section 57 and over the primary is wound a secondary winding 59. A disc 60 of insulating material rests on top of the windings, and above disc 60 are discs 61 of magnetic material. A disc 62 of insulating material rests upon the upper disc 61. With the arrangement described, the upper secondary winding and its primary winding section are partially enclosed within ferrous members which provide a magnetic path for the secondary having a gap within the coils which extends from the upper disc 55 to the lower disc 61.

A tube 63 of non-magnetic material rests upon disc 62 and encloses the portion of tube 44 above disc 62. A plug 64 of non-magnetic material is inserted in the upper end of tube 44, and the plug is formed with a flange overlying the upper end of tubes 44 and 63. A supporting member 65 of non-magnetic material is threaded through the plug and held in place by a nut 66 of non-magnetic material.

An armature, generally designated 67, is mounted within tube 44, and it consists of a central magnetic portion 68 and end sections 69, 70 of non-magnetic material. These parts are held together by a threaded non-magnetic rod 71 which extends out of the top of section 69. A spring 72 is screwed on the exposed end of rod 71, and also on a portion of supporting member 65 extending beneath plug 64.

A plug 73 of non-magnetic material lies within the lower end of tube 44 against the top of base 40 and the spaces below discs 46, between tubular members 42, 43, and above disc 62 are filled with an insulating compound. The discs 47, 53, and 61 of magnetic material are formed with radial slits 74 to reduce eddy current effects.

In the pick-up illustrated in Fig. 6, the magnetic section 68 of the armature has a length substantially equal to the distance between the mid-points of the secondaries measured axially thereof, and when the pick-up is not in use, the armature lies in such relation to the secondaries that the ends of its magnetic section lie opposite the midpoints of the secondaries. The magnetic path for each secondary includes a part of the magnetic section of the core and also includes a gap represented by the distance in one case between upper disc 47 and the lower end of the magnetic section of the core, and, in the other case, between lower disc 58 and the upper end of the magnetic section of the core. The secondaries of the unit shown in Fig. 6 are connected so that their outputs are opposed, and when current is supplied to the primary and the device is at rest, the secondary outputs balance out and there is no net output supplied to a meter. When the pick-up is subjected to vibration above a critical frequency, the armature remains at rest and the secondaries move relatively thereto. When this occurs, the relative movement produces an increase in the reluctance of the magnetic path through one secondary and a decrease in the reluctance of the magnetic path through the other. With this variation in the reluctance of the two paths, the outputs of the secondaries are unbalanced and a net output is supplied to the meter, which gives an indication.

The pick-up unit illustrated in Fig. 6 thus functions in the same manner as that shown in Fig. 1, and in each case, there is an air gap in the magnetic path of each secondary, which extends lengthwise of that winding. In the Fig. 1 construction, the air gap is relatively short and lies between the ends of its winding, whereas, in the Fig. 6 construction, each air gap is longer and extends from end to end of its winding. In each form of the instrument, the armature remains at rest when the unit is subjected to vibration above a critical frequency, while the windings move relatively thereto. This causes an unbalance in the outputs of the secondaries and the size of the net output varies with the amplitude of vibration of the secondaries. In both constructions, the armature fits closely within the core structure so that its movement is damped by air confined above and below it.

The claims are:

1. In a vibration indicator, the combination of a pair of aligned coaxial secondary windings one above the other, exciting means therefor adapted to be supplied with alternating current, the windings being connected so that their outputs are opposed, ferrous means partially enclosing the windings to provide magnetic paths for the respective windings, each path having a gap lying substantially half way between the ends of its winding and of substantially less length than the winding, an armature of ferrous material movable lengthwise of the windings and of a length substantially equal to the distance between the mid-points of the gaps along the axis of the windings, a tubular guide extending through the windings and terminating above the top of the upper winding, the armature lying within the guide, a member mounted in the guide above the upper winding and adjustable axially of the guide, and a spring within the guide attached at its upper end to the member, the armature being suspended from the lower end of the spring and normally lying with its ends opposite the mid-points of the windings.

2. In a vibration indicator, the combination of a pair of aligned coaxial secondary windings one above the other, exciting means therefor adapted to be supplied with alternating current, the windings being connected so that their outputs are opposed, ferrous means partially enclosing the windings to provide magnetic paths for the respective windings, each path having a gap extending lengthwise of its winding, an armature of ferrous material movable lengthwise of the windings and of a length substantially equal to the distance between the mid-points of the windings, the armature having an axial bore therethrough, a tubular guide extending through the windings and terminating above the top of the upper winding, the armature lying within the guide, a member mounted in the guide above the upper winding and adjustable axially of the guide, a spring within the guide attached at its upper end to the member, the armature being suspended from the lower end of the spring and normally lying with its ends opposite the mid-points of the windings, and a guide rod mounted in the lower end of the tubular guide and extending axially thereof through the bore through the armature.

3. In a vibration indicator, the combination of a pair of aligned coaxial secondary windings one above the other, exciting means therefor adapted to be supplied with alternating current, the windings being connected so that their outputs are opposed, ferrous means partially enclosing the windings to provide magnetic paths for the respective windings, each path having a gap extending lengthwise of its winding, an armature movable lengthwise of the windings and of a length substantially equal to the distance between the mid-points of the windings, a tubular member extending above the windings coaxially thereof, a plug closing the upper end of the member, and a spring attached to the plug and lying within the member, the armature being suspended from the lower end of the spring with its ends normally aligned with the mid-points of the windings.

4. In a vibration indicator, the combination of a pair of secondary windings in vertical coaxial arrangement, exciting means therefor adapted to be supplied with alternating current, a cylindrical housing of magnetic material for the windings, open center discs within the housing at the ends of and between the windings, a core of magnetic material within the windings and extending through the discs, the core being formed of a pair of outer sections lying within the remote ends of the windings and a central section lying within the adjacent ends of the windings, the ends of the central section being spaced from the ends of the outer sections to form gaps, an armature movably mounted within the core and of a length substantially equal to the distance axially of the core between the mid-points of the gaps, and spring means for supporting the armature with its ends aligned with the gaps, the windings being so connected that their outputs are opposed.

5. In a vibration indicator, the combination of a pair of secondary windings in vertical coaxial arrangement, exciting means therefor adapted to be supplied with alternating current, a cylindrical housing of magnetic material for the windings, open center discs within the housing at the ends of and between the windings, a core of magnetic material within the windings and extending through the discs, the core being formed of a pair of outer sections lying within the remote ends of the windings and a central section lying within the adjacent ends of the windings, the ends of the central section being spaced from the ends of the outer sections to form gaps, an armature movably mounted within the core and of a length substantially equal to the distance axially of the core between the mid-points of the gaps, a spring attached to the armature to support it with its ends aligned with the gaps, and a support to which the upper end of the spring is secured, the windings being so connected that their outputs are opposed.

6. In a vibration indicator, the combination of a pair of secondary windings in vertical coaxial arrangement, exciting means therefor adapted to be supplied with alternating current, a cylindrical housing of magnetic material for the windings, open center discs within the housing at the ends of and between the windings, a core of magnetic material within the windings and extending through the discs, the core being formed of a pair of outer sections lying within the remote ends of the windings and a central section lying within the adjacent ends of the windings, the ends of the central section being spaced from the ends of the outer sections to form gaps, a hollow armature movably mounted within the core end of a length substantially equal to the distance axially of the core between the mid-points of the gaps, a spring attached to the armature to support it with its ends aligned with the gaps, a support to which the upper end of the spring is attached, and a fixed guide rod extending through the armature, the windings being so connected that their outputs are opposed.

7. In a vibration indicator, the combination of a pair of secondary windings in vertical coaxial arrangement, exciting means therefor adapted to be supplied with alternating current, a cylindrical housing of magnetic material for the windings, open center discs within the housing at the ends of and between the windings, an armature movably mounted within the core and of a length substantially equal to the distance between the mid-points of the windings, and spring means for supporting the armature with its ends substantially aligned with the mid-points of the windings, the windings being so connected that their outputs are opposed.

ELBIE C. STRONG.

REFERENCES CITED

The following references are of record in the file of this patent:

UNITED STATES PATENTS

| Number | Name | Date |
|---|---|---|
| 1,872,068 | Brown | Aug. 16, 1932 |
| 2,074,417 | Olsen | Mar. 23, 1937 |
| 2,230,945 | Hansell | Feb. 4, 1941 |
| 2,311,079 | Parr | Feb. 16, 1943 |
| 2,313,989 | Caldwell et al. | Mar. 16, 1943 |
| 2,417,097 | Warshaw | Mar. 11, 1947 |